(12) United States Patent
Preston (10) Patent No.: US 12,543,249 B2
(45) Date of Patent: Feb. 3, 2026

(54) LIGHT COLOR CONTROL FOR ADDITIVE LIGHT FIXTURES

(71) Applicant: SIGNIFY HOLDING B.V., Eindhoven (NL)

(72) Inventor: James William Preston, Westford, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 35 days.

(21) Appl. No.: 18/723,893

(22) PCT Filed: Dec. 15, 2022

(86) PCT No.: PCT/EP2022/086237
§ 371 (c)(1),
(2) Date: Jun. 25, 2024

(87) PCT Pub. No.: WO2023/126205
PCT Pub. Date: Jul. 6, 2023

(65) Prior Publication Data
US 2025/0071870 A1  Feb. 27, 2025

Related U.S. Application Data

(60) Provisional application No. 63/295,631, filed on Dec. 31, 2021.

(30) Foreign Application Priority Data

Jan. 17, 2022  (EP) ..................................... 22151721

(51) Int. Cl.
*H05B 45/22* (2020.01)
*H05B 47/155* (2020.01)

(52) U.S. Cl.
CPC ........... *H05B 45/22* (2020.01); *H05B 47/155* (2020.01)

(58) Field of Classification Search
CPC .............................. H05B 45/22; H05B 47/155
See application file for complete search history.

(56) References Cited

U.S. PATENT DOCUMENTS 9,668,315 B2 * 5/2017 Shearer ................ H05B 47/105
10,337,917 B2 * 7/2019 Bilenko ............... G01N 21/645
(Continued)

FOREIGN PATENT DOCUMENTS

CN    102595722 A  *  7/2012
FR     3154897 A1  *  5/2025  ............. H05B 45/20
(Continued)

*Primary Examiner* — Adam D Houston (57) ABSTRACT

A method of controlling a color of a light provided by a light fixture includes obtaining measured color values of first lights and measured color values of second lights. The method includes determining a resultant color of a first light beam at least based on the measured color values of the first lights and determining a resultant color of a second light beam at least based on the measured color values of the second lights. The method includes controlling first power provided to LEDs of a first LED-optics cluster and second power provided to LEDs of a second LED-optics cluster at least based on the resultant color of the first light beam and the resultant color of the second light beam such that a color of a combined light that is a combination the first light beam and the second light beam has a color matching target color, wherein the relative contributions of individual lights of the first lights to the first light beam are determined based on a value of a target beam angle of the combined light and wherein the relative contributions of individual lights of the second lights to the second light beam are determined based on the value of the target beam angle of the combined light.

13 Claims, 8 Drawing Sheets

(56) References Cited

U.S. PATENT DOCUMENTS

| | | | | |
|---|---|---|---|---|
| 10,555,395 B1* | 2/2020 | Qiu | ................ | H05B 45/20 |
| 10,595,375 B2* | 3/2020 | Lambooij | ............. | H05B 45/20 |
| 10,652,962 B1* | 5/2020 | Qiu | ................ | H05B 45/40 |
| 10,863,599 B2* | 12/2020 | Janik | ................ | H05B 45/20 |
| 11,240,895 B2* | 2/2022 | Qiu | ................ | H05B 45/28 |
| 12,089,307 B2* | 9/2024 | Bonne | ................ | H05B 45/44 |
| 12,219,675 B2* | 2/2025 | Peeters | ................ | A61N 5/0618 |
| 2009/0090843 A1* | 4/2009 | Lim | ................ | H05B 45/22 |
| | | | | 250/205 |
| 2009/0200907 A1* | 8/2009 | Zukauskas | ............. | H05B 45/20 |
| | | | | 313/1 |
| 2009/0231832 A1* | 9/2009 | Zukauskas | ......... | H10H 20/8513 |
| | | | | 362/84 |
| 2011/0273468 A1 | 11/2011 | Chong et al. | | |
| 2012/0299476 A1* | 11/2012 | Roberts | ................ | B60Q 1/2603 |
| | | | | 315/77 |
| 2013/0076250 A1* | 3/2013 | Logiudice | ................ | H05B 45/37 |
| | | | | 315/161 |
| 2017/0127489 A1* | 5/2017 | Zulim | ................ | H05B 45/20 |
| 2020/0146122 A1* | 5/2020 | Shearer | ................ | H05B 47/105 |
| 2021/0022222 A1* | 1/2021 | Chitta | ................ | H05B 47/155 |
| 2024/0040683 A1* | 2/2024 | Kotal | ................ | H05B 45/24 |
| 2024/0431007 A1* | 12/2024 | Maa | ................ | H05B 45/22 |
| 2025/0071870 A1* | 2/2025 | Preston | ................ | H05B 45/22 |
| 2025/0071875 A1* | 2/2025 | Preston | ................ | H05B 47/155 |

FOREIGN PATENT DOCUMENTS

| | | | | |
|---|---|---|---|---|
| WO | WO-2009117287 A2 * | 9/2009 | ......... | H10H 20/8513 |
| WO | 2013111134 A1 | 8/2013 | | |
| WO | 2018198062 A1 | 11/2018 | | |
| WO | 2021191049 A1 | 9/2021 | | |
| WO | WO-2024260859 A1 * | 12/2024 | ............. | H05B 45/46 |

\* cited by examiner

LIGHT COLOR CONTROL FOR ADDITIVE LIGHT FIXTURES

CROSS-REFERENCE TO PRIOR APPLICATIONS

This application is the U.S. National Phase application under 35 U.S.C. § 371 of International Application No. PCT/EP2022/086237, filed on Dec. 15, 2022, which claims the benefit of U.S. Provisional Patent Application No. 63/295,631, filed on Dec. 31, 2021 and European Patent Application No. 22151721.2, filed on Jan. 17, 2022. These applications are hereby incorporated by reference herein.

TECHNICAL FIELD

The present disclosure relates generally to lighting solutions, and more particularly to controlling the color of light provided by additive lighting systems.

BACKGROUND

Some light fixtures provide lights that can be adjusted to have a particular color. Because of variations in light sources (e.g., light emitting diode (LED) light sources), the colors of lights provided by light fixtures based on the same target color may vary. For example, inherent variations in LEDs may lead to inconsistencies in the colors of lights provided by light fixtures that are configured to provide lights having the same color. Indeed, color inconsistencies may occur among lights emitted by LEDs of the same light fixture. In additive light fixtures where LEDs emit lights having a "particular color" at different intensities in order to achieve a desired beam angle, inherent variations in the LEDs may lead to differences in the colors of the lights. Thus, a solution that accounts for variations in the colors of the lights provided by different LED light sources to achieve a target color of a light may be desirable.

SUMMARY

The present disclosure relates generally to lighting solutions, and more particularly to controlling the color of light provided by additive lighting systems. In an example embodiment, a method of controlling a color of a light provided by a light fixture includes obtaining, by a controller, measured color values of first lights, where light emitted diodes (LEDs) of a first LED-optics cluster are configured to emit the first lights having colors that are shades of a first color that are different from each other. The terms "measured color value" and "measured color values" as used throughout this specification refer to both color and flux values that are measured. The method further includes obtaining, by the controller, measured color values of second lights. LEDs of a second LED-optics cluster are configured to emit the second lights having colors that are shades of a second color that are different from each other. The method further includes determining, by the controller, a resultant color of a first light beam at least based on the measured color values of the first lights. The first light beam includes the first lights according to relative contributions of individual lights of the first lights to the first light beam. The method further includes determining, by the controller, a resultant color of a second light beam at least based on the measured color values of the second lights. The second light beam includes the second lights according to relative contributions of individual lights of the second lights to the second light beam. The method further includes controlling, by the controller, first power provided to the LEDs of the first LED-optics cluster and the second power provided to the LEDs of the second LED-optics cluster at least based on the resultant color of the first light beam and the resultant color of the second light beam such that a color of a combined light that is a combination at least the first light beam and the second light beam has a color matching a target color.

In another example embodiment, a light fixture that emits a light with a controllable color includes a first LED-optics cluster designed to provide a first light beam. The light fixture further includes a second LED-optics cluster designed to provide a second light beam. The light fixture is also includes a controller configured to determine a resultant color of a first light beam at least based on measured color values of first lights, where the first light beam includes first lights according to relative contributions of individual lights of the first lights to the first light beam and where LEDs of the first LED-optics cluster are configured to emit the first lights having colors that are shades of a first color that are different from each other. The controller is further configured to determine a resultant color of a second light beam at least based on measured color values of second lights, where the second light beam includes the second lights according to relative contributions of individual lights of the second lights to the second light beam and where LEDs of the second LED-optics cluster are configured to emit the second lights having colors that are shades of a second color that are different from each other. The controller is also configured to control first power provided to the LEDs of the first LED-optics cluster and the second power provided to the LEDs of the second LED-optics cluster at least based on the resultant color of the first light beam and the resultant color of the second light beam such that a color of a combined light that is a combination at least the first light beam and the second light beam has a color matching a target color.

These and other aspects, objects, features, and embodiments will be apparent from the following description and the appended claims.

BRIEF DESCRIPTION OF THE FIGURES

Reference will now be made to the accompanying drawings, which are not necessarily drawn to scale, and wherein.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals used in different drawings may designate like or corresponding but not necessarily identical elements.

DETAILED DESCRIPTION OF THE EXAMPLE EMBODIMENTS

In the following paragraphs, example embodiments will be described in further detail with reference to the figures. In the description, well known components, methods, and/or processing techniques are omitted or briefly described. Furthermore, reference to various feature(s) of the embodiments is not to suggest that all embodiments must include the referenced feature(s).

Figure 1:
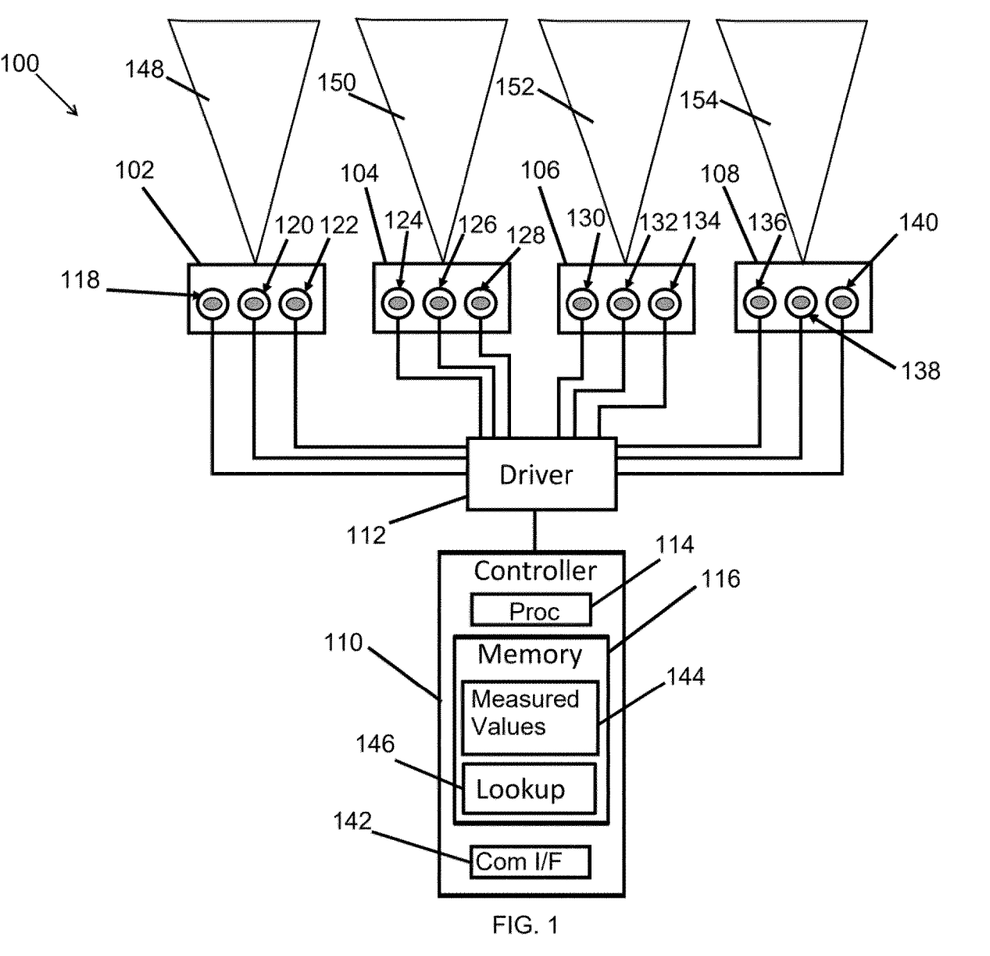
FIG. 1 illustrates a light fixture that is controllable to provide a light having a desired color according to an example embodiment.

FIG. 1 illustrates a light fixture 100 that is controllable to provide a light having a desired color according to an example embodiment. In some example embodiments, the light fixture 100 includes LED-optics clusters 102, 104, 106, 108. The light fixture 100 may also include a controller 110 and a driver 112. The driver 112 may provide power to the LED-optics clusters 102-108. For example, the driver 112 may be a driver that provides power compatible with light emitting diodes (LEDs) of the LED-optics clusters 102-108. The controller 110 may provide control signals to the driver 112 to control the amount of power that is provided to the LED-optics clusters 102-108.

In some example embodiments, the LED-optics clusters 102 includes LED-optics units 118, 120, 122. The LED-optics clusters 104 may include LED-optics units 124, 126, 128. The LED-optics clusters 106 may include LED-optics units 130, 132, 134. The LED-optics clusters 108 may include LED-optics units 136, 138, 140. The LED-optics clusters 102 may emit a light beam 148, where the beam angle of the light beam 148 may be controllable. The LED-optics clusters 104 may emit a light beam 150 having a controllable light beam angle. The LED-optics clusters 106 may emit a light beam 152 having a controllable light beam angle. The LED-optics clusters 108 may emit a light beam 154 having a controllable light beam angle.

In some example embodiments, the light provided by the light fixture 100 is a combination of the light beams 148-154. For example, at a far field location from the light fixture 100, two or more of the light beams 148-154 may fully or partially overlap each other, for example, on a wall or a floor. The color of the light provided by the light fixture 100 may be a combination of two or more of the light beams 148-154. The controller 110 may control the LED-optics clusters 102-108 to set or adjust the colors of the light beams 148-154 to achieve a target (i.e., desired) color of the overall light provided by the light fixture 100.

Figure 2:
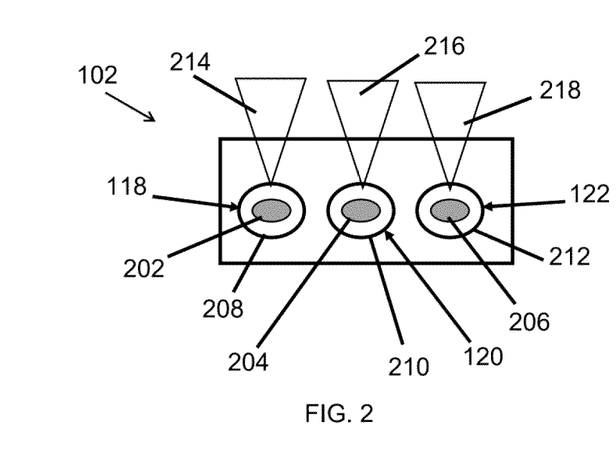
FIGS. 2-5 illustrate LED-optics clusters of the light fixture of FIG. 1 according to an example embodiment.

FIGS. 2-5 illustrate LED-optics clusters of the light fixture of FIG. 1 according to an example embodiment. Referring to FIGS. 1 and 2, in some example embodiments, the LED-optics unit 118 may include an LED 202 and a secondary optics 208 that covers the LED 202 as shown in FIG. 2. The LED-optics unit 120 may include an LED 204 and a secondary optics 210 that covers the LED 204. The LED-optics unit 122 may include an LED 206 and a secondary optics 212 that covers the LED 206. The LEDs 202, 204, 206 may emit through the respective secondary optics 208-212 lights 214, 216, 218. For example, the light beam 148 may be an additive light beam that is a combination of the lights 214-218. The lights 214-218 may have colors that are slight variations of the same color. For example, the LED 202 may emit through the secondary optics 208 the light 214 having a green color. The LED 204 may emit through the secondary optics 210 the light 216 having a green color that is slightly different from the green color of the light 214. The LED 206 may emit through the secondary optics 212 the light 218 having a green color that is slightly different from the green colors of the lights 214, 216. The green colors of the lights 214-218 may be slightly different from each other, for example, due to inherent variations in the LEDs 202-206. The green colors of the lights 214-218 may be considered as shades of green.

In some example embodiments, the secondary optics 208-212, which may be made from glass, silicone, or another suitable material, may have different lighting distribution characteristics from each other, which enable adjustments of the beam angle of the light beam 148. That is, if the secondary optics 208-212 are separately used with a light source, the light distributions (i.e., radiation patterns) resulting from the light from the light source passing through the secondary optics 208, 210, 212 are different from each other. By adjusting the power provided to each LED of the LEDs 202-206, the beam angle of the light beam 148 may be adjusted.

Figure 3:
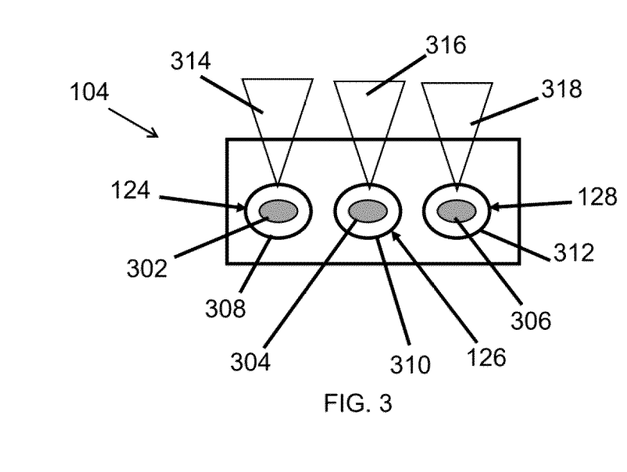

Referring to FIGS. 1 and 3, in some example embodiments, the LED-optics unit 124 may include an LED 302 and a secondary optics 308 that covers the LED 302 as shown in FIG. 3. The LED-optics unit 126 may include an LED 304 and a secondary optics 310 that covers the LED 304. The LED-optics unit 128 may include an LED 306 and a secondary optics 312 that covers the LED 306. The LEDs 302, 304, 306 may emit through the respective secondary optics 308-312 lights 314, 316, 318. For example, the light beam 150 may be an additive light beam that is a combination of the lights 314-318. The lights 314-318 may have colors that are slight variations of the same color. For example, the LED 302 may emit through the secondary optics 308 the light 314 having a blue color. The LED 304 may emit through the secondary optics 310 the light 316 having a blue color that is slightly different from the blue color of the light 314. The LED 306 may emit through the secondary optics 312 the light 318 having a blue color that is slightly different from the blue colors of the lights 314, 316. The blue colors of the lights 314-318 may be slightly different from each other, for example, due to inherent variations in the LEDs 302-306. The blue colors of the lights 314-318 may be considered as shades of blue.

In some example embodiments, the secondary optics 308-312, which may be made from glass, silicone, or another suitable material, may have different lighting distribution characteristics from each other, which enable adjustments of the beam angle of the light beam 150. That is, if the secondary optics 308-312 are separately used with a light source, the light distributions (i.e., radiation patterns) resulting from the light from the light source passing through the secondary optics 308-312 are different from each other. By adjusting the power provided to each LED of the LEDs 302-306, the beam angle of the light beam 150 may be adjusted.

Figure 4:
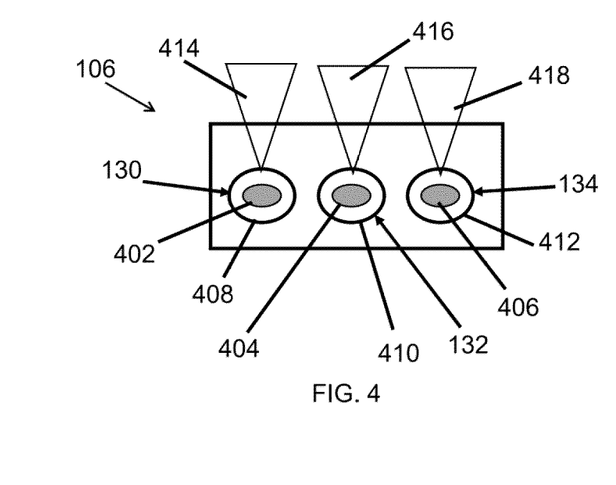

Referring to FIGS. 1 and 4, in some example embodiments, the LED-optics unit 130 may include an LED 402 and a secondary optics 408 that covers the LED 402 as shown in FIG. 4. The LED-optics unit 132 may include an LED 404 and a secondary optics 410 that covers the LED 404. The LED-optics unit 134 may include an LED 406 and a secondary optics 412 that covers the LED 406. The LEDs 402, 404, 406 may emit through the respective secondary optics 408-412 lights 414, 416, 418. For example, the light beam 152 may be an additive light beam that is a combination of the lights 414-418. The lights 414-418 may have colors that are slight variations of the same color. For example, the LED 402 may emit through the secondary optics 408 the light 414 having a red color. The LED 404 may emit through the secondary optics 410 the light 416 having a red color that is slightly different from the red color of the light 414. The LED 406 may emit through the secondary optics 412 the light 418 having a red color that is slightly different from the red colors of the lights 414, 416. The red colors of the lights 414-418 may be slightly different from each other, for example, due to inherent variations in the LEDs 402-406. The red colors of the lights 414-418 may be considered as shades of red.

In some example embodiments, the secondary optics 408-412, which may be made from glass, silicone, or another suitable material, may have different lighting distribution characteristics from each other, which enable adjustments of the beam angle of the light beam 152. That is, if the secondary optics 408-412 are separately used with a light source, the light distributions (i.e., radiation patterns) resulting from the light from the light source passing through the secondary optics 408-412 are different from each other. By adjusting the power provided to each LED of the LEDs 402-406, the beam angle of the light beam 152 may be adjusted.

Figure 5:
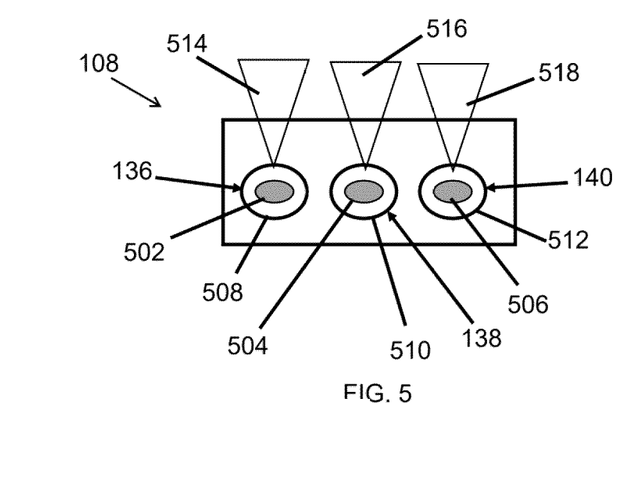

Referring to FIGS. 1 and 5, in some example embodiments, the LED-optics unit 136 may include an LED 502 and a secondary optics 508 that covers the LED 502 as shown in FIG. 5. The LED-optics unit 138 may include an LED 504 and a secondary optics 510 that covers the LED 504. The LED-optics unit 140 may include an LED 506 and a secondary optics 512 that covers the LED 506. The LEDs 502, 504, 506 may emit through the respective secondary optics 508-512 lights 514, 516, 518. For example, the light beam 154 may be an additive light beam that is a combination of the lights 514-518. The lights 514-518 may have colors that are slight variations of the same color. For example, the LED 502 may emit through the secondary optics 508 the light 514 having a "white color" (i.e., white light). The LED 504 may emit through the secondary optics 510 the light 516 having a white color but slightly different from the white color of the light 514. The LED 506 may emit through the secondary optics 512 the light 518 having a white color but slightly different from the white colors of the lights 514, 516. For example, the LEDs 502-506 may be phosphor converted white LEDs, and the "white colors" of the lights 514-518 may be slightly different from each other, for example, due to inherent variations in the LEDs 502-506. The "white colors" of the lights 514-518 may be considered as shades of white.

In some example embodiments, the secondary optics 508-512, which may be made from glass, silicone, or another suitable material, may have different lighting distribution characteristics from each other, which enable adjustments of the beam angle of the light beam 154. That is, if the secondary optics 508-512 are separately used with a light source, the light distributions (i.e., radiation patterns) resulting from the light from the light source passing through the secondary optics 508-512 are different from each other. By adjusting the power provided to each LED of the LEDs 502-506, the beam angle of the light beam 154 may be adjusted.

In some example embodiments, respective ones of the secondary optics included in each one of the LED-optics clusters 102-108 may be the same lighting distribution characteristics. To illustrate, the secondary optics 208, 308, 408, 508 may have the same lighting distribution characteristics. That is, if the secondary optics 208, 308, 408, 508 are separately used with a light source, the light distributions (i.e., the radiation patterns) resulting from the light from the light source passing through the secondary optics 208, 308, 408, 508 are the same. The secondary optics 210, 310, 410, 510 may have the same lighting distribution characteristics that are different from the lighting distribution characteristics of the secondary optics 208, 308, 408, 508. The secondary optics 212, 312, 412, 512 may have the same lighting distribution characteristics that are also different from the lighting distribution characteristics of the secondary optics 208, 308, 408, 508.

In some example embodiments, the controller 110 may include a processor 114 (e.g., a microcontroller or a microprocessor), a memory device 116, and a communication interface unit 142. The communication interface unit 142 may include one or more transmitters and/or receivers that use signals compatible with one or more wireless network standards, such as Bluetooth, Wi-Fi, and/or ZigBee and/or wired communication standard such as Ethernet. Alternatively or in addition, the communication interface unit 142 may include a physical user interface such as a keypad, a dipswitch, a touchscreen, etc. To illustrate, the controller 110 may receive user input.

In some example embodiments, the memory device 116 may include one or more memory devices, such as an EEPROMs, static random access memory device, a flash memory, and/or another type of memory device. Software code and data may be stored in the memory device 116. The processor 114 may execute the software code stored in the memory device 116 to perform some operations described herein with respect to the controller 110.

For example, a user input received via the communication interface unit 142 of the controller 110 may indicate a target beam angle value. The processor 114 may obtain information from a lookup table 146 in the memory device 116 based on the user input and control the beam angles of the light beams 148-154 to achieve the desired beam angle of the light provided by the light fixture 100. For example, the processor 114 may control the amount of current provided by the driver 112 to the LEDs 202-206, 302-306, 402-406, 502-506 of the LED-optics clusters 102-108, respectively, based on flux ratio information in the lookup table 146 stored in the memory device 116. The flux ratio information in the lookup table 146 may be generated by characterizing the light beams 148-154 as well as the lights 214-218, 314-318, 414-418, 514-518.

To illustrate, with respect to each light beam of the light beams 148-154, flux ratios of the respective ones of the lights 214-218, 314-318, 414-418, 514-518 result in different beam angle values may be determined. For example, flux ratios of the lights 214-218 that result in different beam angle values of the light beam 148 may be determined and stored in the lookup table 146 with respect to the respective beam angle values. As another example, flux ratios of the lights 314-318 that result in different beam angle values of the light beam 150 may be determined and stored in the lookup table 146 with respect to the respective beam angle values. As yet another example, flux ratios of the lights 414-418 that result in different beam angle values of the light beam 152 may be determined and stored in the lookup table 146 with respect to the respective beam angle values. As yet another example, flux ratios of the lights 514-518 that result in different beam angle values of the light beam 154 may be determined and stored in the lookup table 146 with respect to the respective beam angle values.

Figure 6:
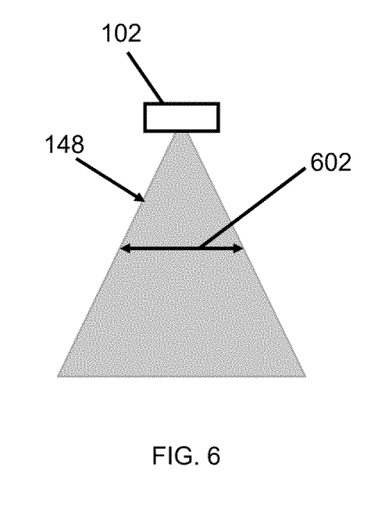
FIG. 6 illustrates a light beam provided by a LED-optics cluster of the light fixture of FIG. 1 according to an example embodiment

To illustrate, FIG. 6 illustrates the light beam 148 provided by the LED-optics cluster 102 of the light fixture 100 of FIG. 1 according to an example embodiment. Referring to FIGS. 1-6, in some example embodiments, a beam angle 602 of the light beam 148 as shown in FIG. 6 may depend on the flux ratios of the lights 214-218. That is, a flux ratio of the of the lights 214-218 may correspond to a value of the beam angle 602, and another flux ratio of the of the lights 214-218 may correspond to another value of the beam angle 602. In general, the beam angle 602 corresponds to the angle of the light beam 148 at which the intensity of the light beam 148 is at 50% percent of the maximum intensity of the light beam 148.

Figure 7:
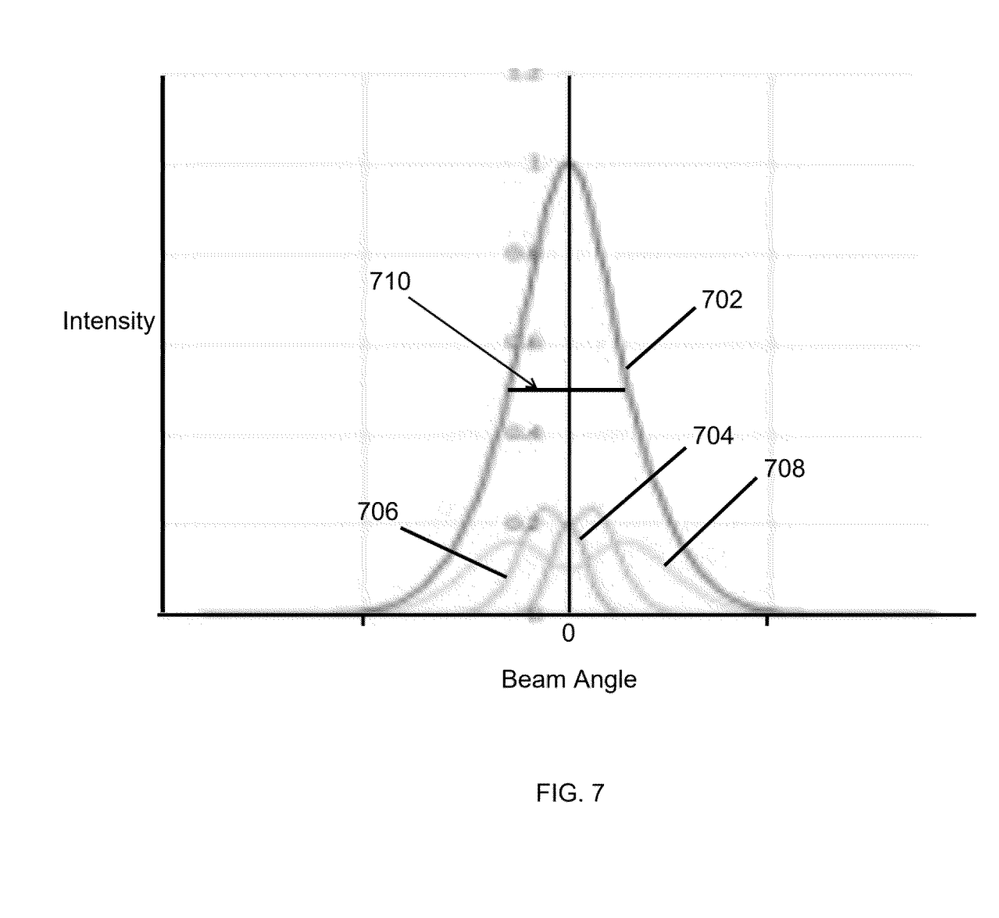
FIG. 7 illustrates intensity-beam angle curves of a light beam and constituent lights of the light beam according to an example embodiment.

FIG. 7 illustrates intensity-beam angle curves of the light beam 148 and the constituent lights 214-218 of the light beam 148 according to an example embodiment. Referring to FIGS. 1-7, as described above, the light beam 148 may be an additive light beam that is a combination the lights 214-218 provided by the LED-optics units 118-122. In FIG. 7, the curve 702 indicates the normalized intensity of the light beam 148. The curve 704 may correspond to the light 214 provided by the LED-optics unit 118. The light provided by the LED-optics unit 118 is emitted by the LED 202 and provided through the secondary optics 208. The curve 706 may correspond to the light 216 provided by the LED-optics unit 120. The light provided by the LED-optics unit 120 is emitted by the LED 204 and provided through the secondary optics 210. The curve 708 may correspond to the light 218 provided by the LED-optics unit 122. The light provided by the LED-optics unit 122 is emitted by the LED 206 and provided through the secondary optics 212. As indicated above, the colors of lights 214-218 may be shades of the same color (e.g., shades of green). In general, the lights 214-218 may have wavelengths corresponding to a green light.

In some example embodiments, the curve 702 is a normalized sum of the curves 704-708. For example, the secondary optics 208-212 may be designed such that summing the curves 704-708 produces the curve 702, which may be a Gaussian curve. The beam angle 602 of the light beam 148 shown in FIG. 6 may correspond to the full width half max of the curve 702. For example, the beam angle 602 may equal the full width half max value 710 of the curve 702. The full width half max value 710 and the shape of the curve 702 may be changed by changing one or more of the curves 704, 706, 708.

To illustrate, changing the intensity of the lights 214, 216, 218 may change the fluxes of the lights 214, 216, 218, and the value of the beam angle 602 may depend on the ratio of the values of the fluxes of the lights 214, 216, 218 (i.e., the ratio of areas under the curves 704, 706, 708). For example, the narrowest beam angle value of the beam angle 602 of the light beam 148 (i.e., the smallest value of the full width half max of the curve 702) may be achieved by turning off or significantly reducing the intensities of the lights provided by the LED-optics units 120, 122, which are represented by the curves 706, 708. As another example, the widest beam angle value of the beam angle 602 of the light beam 148 may be achieved by turning off or significantly reducing the intensity of the light provided by the LED-optics unit 120, which corresponds to the curve 706, and by increasing the intensity of the light provided by the LED-optics unit 122, which corresponds to the curve 708. As yet another example, a beam angle value that is between the narrowest beam angle value and the widest beam angle value of the beam angle 602 may be achieved by controlling the intensities of the lights 214, 216, 218, which respectively correspond to the curves 704, 706, 708, between intensities of the lights 214, 216, 218 that result in the narrowest beam angle value and the widest beam angle value.

Figure 8:
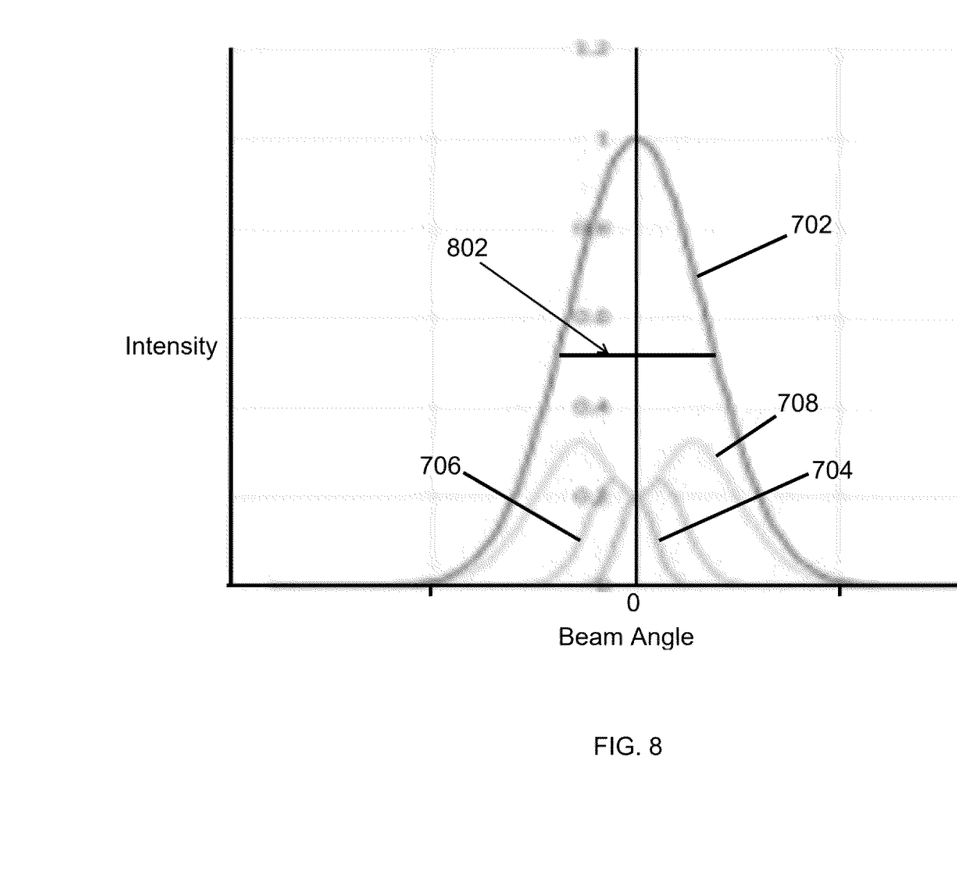
FIG. 8 illustrates intensity-beam angle curves of a light beam and constituent lights of the light beam according to another example embodiment.

FIG. 8 illustrates intensity-beam angle curves of the light beam 148 and constituent lights 214-218 of the light beam 148 according to another example embodiment. Referring to FIGS. 1-8, in some example embodiments, the curve 708 in FIG. 8 representing the intensity of the light 218 provided by the LED-optics unit 122 has a larger area (i.e., more flux) than the curve 708 shown in FIG. 7. The larger area of the curve 708 shown in FIG. 8 results in the full width half max value 802 of the curve 702 in FIG. 8 being larger than the full width half max value 710 of the curve 702 in FIG. 7. The full width half max value 802 of FIG. 8 corresponds to a larger value of the beam angle 602 of the light beam 148 compared to the value of the beam angle 602 corresponding to the full width half max value 710 of the curve 702 in FIG. 7.

As indicated above, the curves 704, 706, and 708 in FIG. 7 may correspond to the lights 214, 216, 218, respectively, shown in FIGS. 2-5. In some example embodiments, the ratios of the fluxes of the lights 214, 216, 218 (i.e., the ratios of the areas under the curves 704, 706, 708) may be included in the lookup table 146 of the controller 110 in association with respective values of the beam angle 602 of the light beam 148 (i.e., values of the full width half max of the curve 702). As a non-limiting example, a flux ratio of the fluxes of the lights 214, 216, 218 may be expressed as fg1:fg2:fg3, where fg1 corresponds to the flux of the light 214, where fg2 corresponds to the flux of the light 216, and where fg3 corresponds to the flux of the light 218. To illustrate, using the flux of the light 214 corresponding to the area under the curve 704 as a reference value, a flux ratio fg1:fg2:fg3 of the fluxes of the lights 214, 216, 218 may be, as an illustrative example, 1:1.5:2. As another example, the flux ratio fg1:fg2:fg3 may be 1:1.5:3. As yet another example, the flux ratio fg1:fg2:fg3 may be 1:1:4. As yet another example, the flux ratio fg1:fg2:fg3 may be 1:0.5:4. In some example embodiments, flux ratios may have other formats as can be readily understood by those of ordinary skill in the art with the benefit of this disclosure.

In general, the areas under the curves 704-708 and associated values of the full width half max half of the curve 702 may be determined, for example, through calculation as can be readily understood by those of ordinary skill in the art with the benefit of this disclosure. The controller 110 may use the ratios in the lookup table 146 to control the current provided to the LEDs 202, 204, 206 of the LED-optics units 118, 120, 122 to achieve the associated values of the beam angle 602 of the light beam 148. For example, to achieve a desired value of the beam angle 602 of the light beam 148, the intensities of the lights 214, 216, 218 may be controlled by providing current to the LEDs 202, 204, 206 according to the ratios of the fluxes (i.e., areas under the curves 704-708) corresponding to the desired value of the beam angle 602. To illustrate, the processor 114 may use a desired beam angle value indicated by a user input to obtain from the lookup table 146 the ratio of fluxes associated with the desired beam angle value and control the current provided by the driver 112 to the LEDs 202, 204, 206 according to the ratio of the fluxes (i.e., in proportion of the values of the ratio) such that the beam angle 602 of the light beam 148 has the desired beam angle value.

In some example embodiments, the intensities of the lights 314-318, 414-418, 514-518 provided by the LED-optics units 124-128, 130-134, 136-140, respectively, may be represented by curves similar to the curves 704-706, and the intensities of the light beams 150-154 may be represented by curves similar to the curve 702 shown in FIGS. 7 and 8. In some cases, differences in die sizes among different color light LEDs and/or use of phosphor converted LEDs may result in variations in the curves, and thus the same beam angle value with respect to the light beams 148-154 may be associated with different flux ratios of the respective sets of the lights 314-318, 414-418, 514-518.

In some example embodiments, flux ratios (i.e., the ratios of areas under the curves) with respect to the lights 314-318, 414-418, 514-518 may be included in the lookup table 146 and used to control the beam angles of the light beams 150-154 in the manner described with respect to the light beam 148. The flux ratios with respect to the lights 314-318, 414-418, 514-518 may be expressed as fb1:fb2:fb3, fr1:fr2:fr3, and fw1:fw2:fw3, respectively, and may be stored in association with respective beam angle values of the light beams 150-154. For example, fb1, fb2, and fb3 may correspond to the fluxes of the lights 314, 316, 318, respectively, fr1, fr2, and fr3 may correspond to the fluxes of the lights 414, 416, 418, respectively, and fw1, fwb2, and fw3 may correspond to the fluxes of the lights 514, 516, and 518, respectively. Using the flux ratios in the lookup table 146 and a target beam angle value indicated by a user input, the controller 110 may control the distribution of current among the LED-optics units 124-128 of the LED-optics cluster 104, the distribution of current among the LED-optics units 130-134 of the LED-optics cluster 106, and the distribution of the current among the LED-optics units 136-140 of the LED-optics cluster 108 in the same manner as described with respect to the LED-optics units 118-122 of the LED-optics clusters 102.

In some example embodiments, by using the ratios and associated beam angle values included in the lookup up table 146 with respect to each light beam of the light beams 148-154, the processor 114 of the controller 110 may control the light beams 148-154 such that none of the beam angles of the light beams 148-154 are smaller than larger of the narrowest beam angle values of the light beams 148-154 and such that none of the beam angles of the light beams 148-154 are larger than the smaller of the widest beam angle values of the light beams 148-154. The processor 114 of the controller 110 may also control the light beams 148-154 such that the beam angles of the light beams 148-154 have the same value within a range bound by the larger of the narrowest beam angle values of the light beams 148-154, and by smaller of the widest beam angle values of the light beams 148-154.

In some example embodiments, the user input received via the communication interface unit 142 of the controller 110 may also indicate a target color of the light provided by the light fixture 100, which is the combination of the light beams 148-154 that may have colors that are different colors from each other. For example, the desired color of the light may be achieved by using one light beam from among the light beams 148-154 or a combination of the two or more light beams of the light beams 148-154. Because the color of the light provided by the light fixture 100 depends on the amount of contribution of the individual light beams 148-154, to adjust the color of the light, the controller 110 may allocate the amount of current to be provided by the driver 112 to each LED-optics cluster 102-108. The current provided to each LED-optics cluster 102-108 to achieve the target color of the light may be distributed among the LEDs of each LED-optics cluster 102-108 based on the flux ratios with respect to each light beam 148-154 in the lookup table 146 that correspond to the target beam angle value indicated by the user input.

In some example embodiments, the controller 110 may control the color of the light provided by the light fixture 100 based on measured color values. The terms "measured color value" and "measured color values" as used throughout this specification refer to both color and flux values that are measured. For example, a spectrophotometer or a colorimeter may be used to perform measurements of the color and flux of the lights 214-218, 314-318, 414-418, 514-518 provided by the LED-optics units 118-122, 124-128, 130-134, 136-140. The measured color values may be, for example, tristimulus values and may be stored in the memory device 116 in a measured color value list 144 in association with the identifiers of the respective LEDs or LED-optics units. The color and flux measurements may be performed at the factory using the individual LEDs before assembly of the LED-optics units 118-122, 124-128, 130-134, 136-140. Alternatively, the color and flux measurements may be performed at the factory using the individual LEDs as part of the LED-optics units 118-122, 124-128, 130-134, 136-140.

Figure 9:
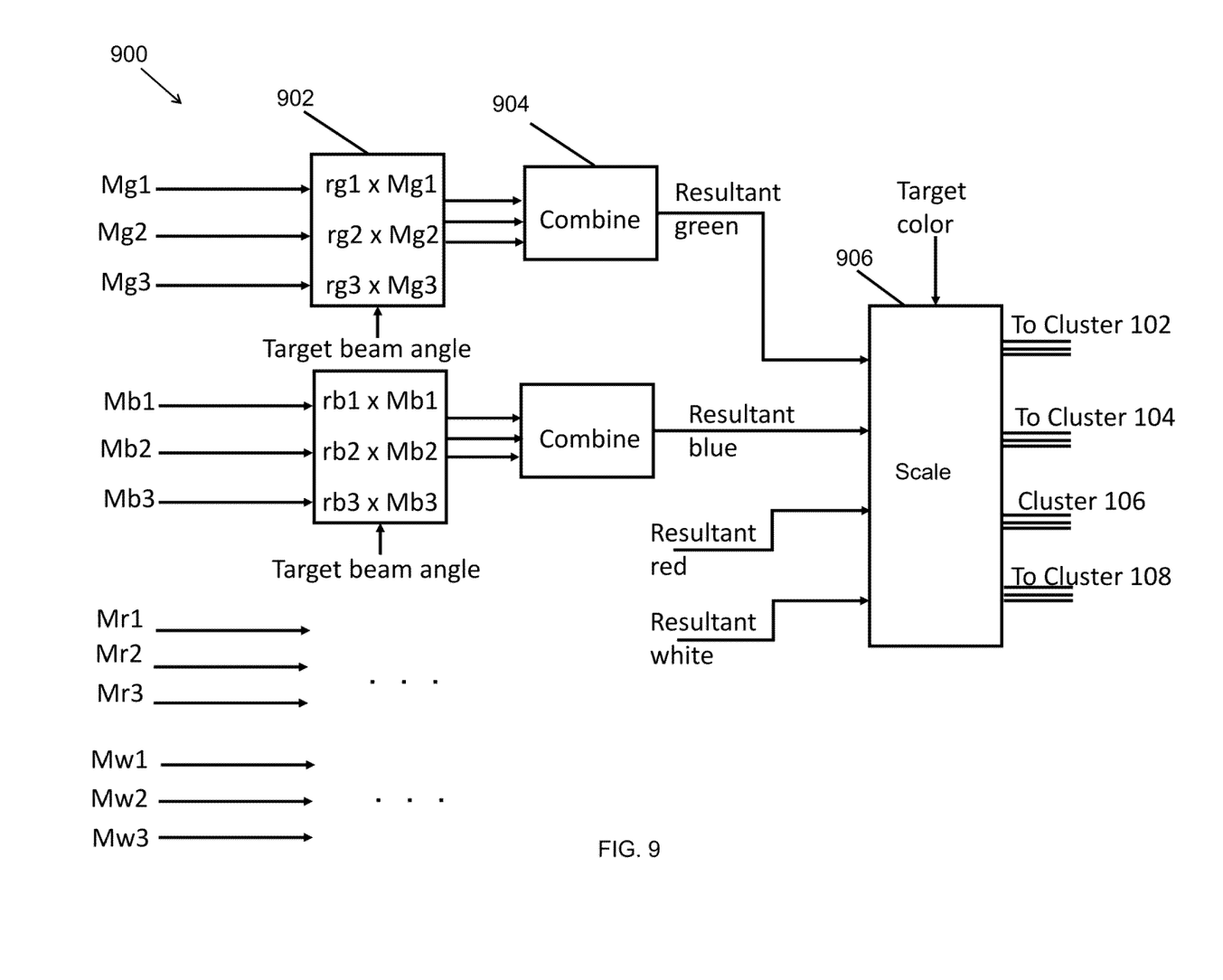
FIG. 9 illustrates a block diagram of operations performed to control the color of the light provided by the light fixture of FIG. 1 based on measured color values according to an example embodiment.

FIG. 9 illustrates a block diagram 900 of operations performed to control the color of the light provided by the light fixture 100 of FIG. 1 based on measured color values according to an example embodiment. Referring to FIGS. 1-9, in some example embodiments, the operations shown in FIG. 9 may be performed by the controller 110 of the light fixture 100. In FIG. 9, Mg1, Mg2, and Mg3 may be the measured color values of the lights 214, 216, 218, respectively. Mb1, Mb2, and Mb3 may be the measured color values of the lights 314, 316, 318, respectively. Mr1, Mr2, and Mr3 may be the measured color values of the lights 414, 416, 418, respectively. Mw1, Mw2, and Mw3 may be the measured color values of the lights 514, 516, 518, respectively. As indicated above, in some example embodiments, the colors of the lights 214, 216, 218 may be shades of green, the colors of the lights 314, 316, 318 may be shades of blue, the colors of the lights 414, 416, 418 may be shades of red, and the "colors" of the lights 514, 516, 518 may be shades of white. The processor 114 may obtain the measured color values from the memory device 116.

In FIG. 9, rg1, rg2, rg3 are values derived with respect to the lights 214, 216, 218 based on the sum of ratio values fg1, fg2, fg3 in the flux ratio fg1:fg2:fg3 corresponding to the value of the target beam angle received as a user input. For example, rg1 may correspond to the light 214 and may be expressed as fg1 as a portion of the sum of the ratio values fg1, fg2, fg3. rg2 may correspond to the light 216 and may be expressed as fg2 as a portion of the sum of the ratio values fg1, fg2, fg3. rg3 may correspond to the light 218 and may be expressed as fg3 as a portion of the sum of the ratio values fg1, fg2, fg3. To illustrate, when the flux ratio fg1:fg2:fg3 is 1:1.5:3, the values of rg1, rg2, rg3 are 0.18, 0.27, 0.55. As described above, the flux ratio (i.e., fg1:fg2:fg3) may be determined based on the curves 704-708 shown in FIGS. 7 and 8, and the flux ratios are included in the lookup table 146 stored in the memory device 116 in association with respective beam angle values. In some example embodiments, the values rg1, rg2, rg3 may also be stored in the memory device 116, for example, as part of the lookup table 146. After receiving the value of the target beam angle, the processor 114 may determine or obtain the ratio values, rg1, rg2, rg3, from the lookup table 146 and perform operation 902 by scaling the measured color values, Mg1, Mg2, and Mg3, by the ratio values rg1, rg2, rg3. For example, Mg1 is multiplied by rg1, Mg2 is multiplied by rg2, and Mg3 is multiplied by rg3. In some alternative embodiments, the values fg1, fg2, fg3 of the flux ratio fg1:fg2:fg3 may be used instead of the values rg1, rg2, rg3 without departing from the scope of this disclosure. In some alternative embodiments, other values derived from the flux ratio fg1:fg2:fg3 may be used instead of the values rg1, rg2, rg3 without departing from the scope of this disclosure.

In some example embodiments, the processor 114 may perform operation 904 to combine the scaled tristimulus values that resulted from the operation 902. For example, the processor 114 may add the scaled tristimulus values to obtain combined scaled tristimulus values of a resultant green color of the light beam 148. Scaling the measured color values, Mg1, Mg2, Mg3, by the ratio values, rg1, rg2, rg3, associated with the value of the target beam angle accounts for the relative contributions by the lights 214, 216, 218, which may have colors that are different shades of green, to the light beam 148.

In some example embodiments, the measured color values, Mb1, Mb2, and Mb3, may be multiplied by rb1, rb2, and rb3, respectively, in the same manner as described with the measured color values Mg1, Mg2, Mg3. The values rb1, rb2, and rb3 may be determined from the flux ratio fb1:fb2:fb3, described above, in the same manner as described with respect to the values rg1, rg2, rg3. Measured color values, Mr1, Mr2, Mr3, may be multiplied by values rr1, rr2, rr3, respectively, in the same manner as described with the measured color values Mg1, Mg2, Mg3. The values rr1, rr2, and rr3 may be determined from the flux ratio fr1:fr2:fr3, described above, in the same manner as described with respect to the values rg1, rg2, rg3. Measured color values, Mw1, Mw2, Mw3, may be multiplied by rw1, rw2, rw3, respectively, in the same manner as described with the measured color values Mg1, Mg2, Mg3. The values rw1, rw2, and rw3 may be determined from the flux ratio fw1:fw2:fw3, described above, in the same manner as described with respect to the values rg1, rg2, rg3. The respective scaled tristimulus values may be combined to obtain respective combined scaled tristimulus values. For example, combined scaled tristimulus values of a resultant blue color of the light beam 150, combined scaled tristimulus values of a resultant red color of the light beam 152, and combined scaled tristimulus values of a resultant white color of the light beam 154 may be obtained in the same manner as described with respect to the combined scaled tristimulus values of the resultant green color of the light beam 148.

In some example embodiments, the processor 114 may perform operation 906 to determine the ratio of the fluxes of the light beams 148, 150, 152, 154 to achieve the target color based on resultant green color, resultant blue color, resultant red color, and resultant white color determined from operation 904 and respective operations. The processor 114 may perform operation 906 using a method of color tuning to achieve a target color as can be readily understood by those of ordinary skill in the art with the benefit of this disclosure. For example, the processor 114 may assume contributions of the light beams 148, 150, 152 and determine the contribution of the light beam 154 to achieve the target color, which may also be provided as tristimulus values or other values (e.g., DMX values) translatable to tristimulus values. As another example, the processor 114 may assume contributions of the light beams 150, 152, 154 and determine the contribution of the light beam 148 to achieve the target color indicated by the user. To be clear, in some example embodiments, the contribution of one or more of the light beams 148-154 may be zero or negligible without departing from the scope of this disclosure.

In some example embodiments, after determining the ratio of contributions of the light beams 148-154 to the overall light provided by the light fixture 100 that has a color matching the target color indicated by the user input, the controller 110 may control the driver 112 to control the current provided to each of the LED-optics clusters 102-108 according to the ratio of contributions of the light beams 148-154. The controller 110 may control the driver 112 to control the distribution of the current provided to each one of the LED-optics clusters 102-108 among the LEDs of the particular LED-optics cluster based on the respective flux ratios corresponding to the value of the target beam angle indicated by the user input. To illustrate, the processor 114 may control the amounts of current provided by the driver 112 by controlling, for example, the duty cycles of the pulse width modulation (PWM) signals provided by the driver 112.

By using measured light color values instead of assume color values of the lights provided by the LED-optics units 118-122, 124-128, 130-134, 136-140, the color of the light provided by the light fixture 100 can more closely match the target color requested by a user. By accounting for proportional contributions of the lights 214-218, 314-318, 414-418, 514-518 to the light beams 148-154 based on the value of the target beam angle requested by a user, the color of the light provided by the light fixture 100 can even more closely match the target color requested by the user.

In some alternative embodiments, the light fixture 100 may include more or fewer LED-optics clusters than shown without departing from the scope of this disclosure. For example, the LED-optics clusters 104, 106 may be omitted without departing from the scope of this disclosure. As another example, the LED-optics clusters 104 may be omitted without departing from the scope of this disclosure. As another example, the light fixture 100 may include five LED-optics clusters. In some example embodiments, the LED-optics clusters 102-104 may be on the same circuit board or two or more circuit boards without departing from the scope of this disclosure. In some alternative embodiments, each one of the LED-optics clusters 102-104 may include fewer or more LED-optics units than shown without departing from the scope of this disclosure. In some alternative embodiments, the light fixture 100 may include more or fewer components than shown in FIG. 1 without departing from the scope of this disclosure. In some alternative embodiments, the light fixture 100 may include different components than shown in FIG. 1 without departing from the scope of this disclosure. In some alternative embodiments, the light fixture 100 may include different configuration of components than shown in FIG. 1 without departing from the scope of this disclosure. In some alternative embodiments, instead of using the lookup table 146, the controller 110 may perform calculations to determine the distribution of current among the LED-optics units of each one of the clusters of the LED-optics clusters 102-108. In some alternative embodiments, the curves 702-708 shown in FIGS. 7 and 8 may have different shapes than shown without departing from the scope of this disclosure.

Figure 10A:
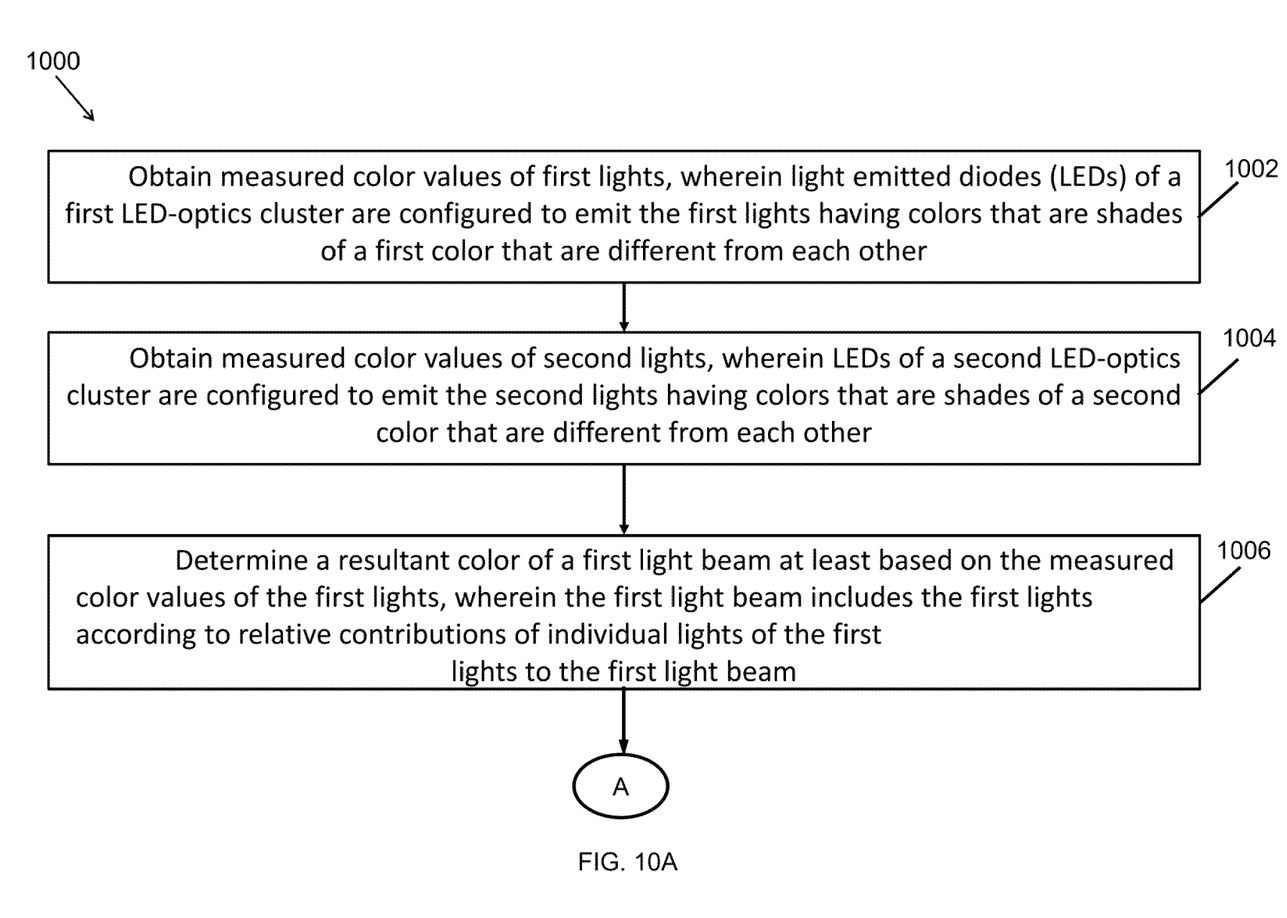
FIGS. 10A and 10B illustrate a method of controlling a color of a light provided by a light fixture of FIG. 1 according to an example embodiment.
Figure 10B:
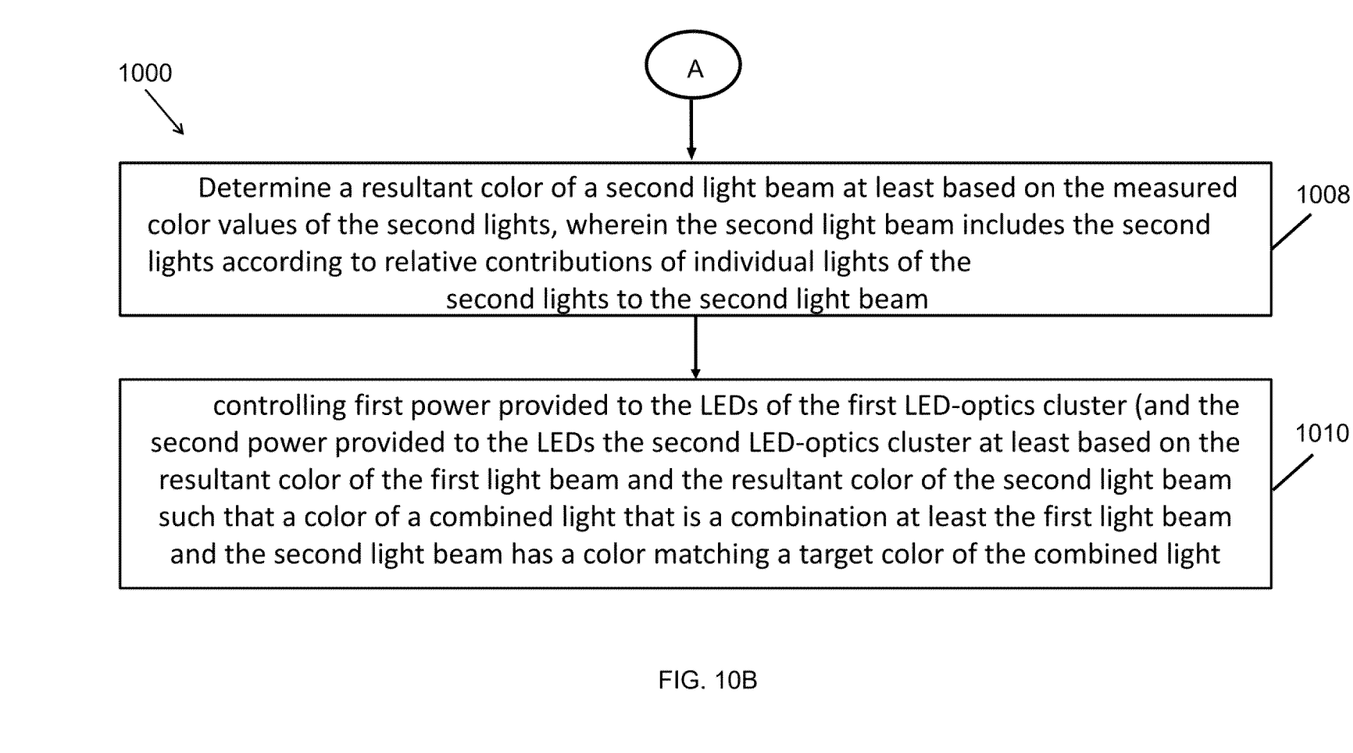

FIGS. 10A and 10B illustrate a method 1000 of controlling a color of a light provided by a light fixture 100 of FIG. 1 according to an example embodiment. Referring to FIGS. 1-10, in some example embodiments, at step 1002, the method 1000 includes obtaining, by the controller 110, measured color values, Mg1, Mg2, Mg3, of lights 214, 216, 218. For example, the measured color values, Mg1, Mg2, Mg3, may be stored in the memory device 116 of the controller 110 as parts of the measured color value list 144, and the processor 114 of the controller 110 may obtain the measured color values, Mg1, Mg2, Mg3, from the memory device 116. The LEDs 202, 204, 206 of the LED-optics cluster 102 are configured to emit the lights 214, 216, 218. The lights 214, 216, 218 may have colors that are shades of a first color (e.g., green) that are different from each other.

In some example embodiments, at step 1004, the method 1000 includes obtaining, by the controller 110, measured color values, Mb1, Mb2, Mb3, of lights 314, 316, 318. For example, the processor 114 of the controller 110 may obtain the measured color values, Mb1, Mb2, Mb3, from the memory device 116. The LEDs 302, 304, 306 of the LED-optics cluster 104 are configured to emit the lights 314, 316, 318 having colors that are shades of a second color (e.g., blue) that are different from each other.

In some example embodiments, at step 1006, the method 1000 includes determining, by the controller 110, a resultant color of the light beam 148 at least based on the measured color values, Mg1, Mg2, Mg3, of the lights 214, 216, 218. For example, the controller 110 may perform operations 902 and 904 described with respect to FIG. 9 to determine the color that the resultant color of the light beam 148. The light beam 148 includes the lights 214, 216, 218 according to relative contributions of individual lights of the lights 214, 216, 218 to the light beam 148. The flux contributions of the lights 214, 216, 218 to the light beam 148 depend on the flux ratio of the lights 214, 216, 218 associated with the value of the target beam angle. At least based on the measured color values, Mg1, Mg2, Mg3, of the lights 214, 216, 218, the controller 110 may determine the color that the light beam 148 will have after adjustment of the power provided to the LEDs 202, 204, 206 of the LED-optics cluster 102 based on the value of the target beam angle.

In some example embodiments, at step 1008, the method 1000 includes determining, by the controller 110, a resultant color of the light beam 150 at least based on the measured color values, Mb1, Mb2, Mb3, of the lights 314, 316, 318. The light beam 150 includes the lights 314, 316, 318 according to relative contributions of individual lights of the lights 314, 316, 318 to the light beam 150 in the same manner as described above with respect to the light beam 148 and step 1006.

In some example embodiments, at step 1010, the method 1000 includes controlling, by the controller 110, first power provided to the LEDs 202, 204, 206 of the LED-optics cluster 102 and the second power provided to the LEDs 302, 304, 306 of the LED-optics cluster 104 at least based on the resultant color of the first light beam 148 and the resultant color of the second light beam 150 such that a color of a combined light that is a combination at least the light beam 148 and the light beam 150 has a color matching a target color. The method 1000 may include controlling, by the controller, proportions of the first power provided to individual LEDs of the LEDs 202, 204, 206 based on a value of a target beam angle of the combined light.

In some example embodiments, the method 1000 may include controlling, by the controller 110, proportions of the first power provided to individual LEDs of the LEDs 202, 204, 206 based on a value of a target beam angle of the combined light. The method 1000 may also include obtaining, by the controller 110, measured color values, Mr1, Mr2, Mr3, of lights 414, 416, 418. The LEDs 402, 404, 406 of an LED-optics cluster 106 are configured to emit the lights 414, 416, 418 having colors that are shades of a third color (e.g., red) that are different from each other. The method 1000 may also include determining, by the controller 110, a resultant color of a light beam 152, where the light beam 152 includes the lights 414, 416, 418 according to relative contributions of individual lights of the lights 414, 416, 418 to the light beam 152 in the same manner as described above with respect to the light beam 148 and step 1006. The method 1000 may also include controlling, by the controller 110, third power provided to the LEDs 502, 504, 506 of the LED-optics cluster 106 at least based on the resultant color of the third light beam 152.

In some example embodiments, the method 1000 may include obtaining, by the controller 110, measured color values, Mw1, Mw2, Mw3, of lights 514, 516, 518, where LEDs 502, 504, 506 of the fourth LED-optics cluster 108 are configured to emit the lights 514, 516, 518 having colors that are shades of white that are different from each other. The method 1000 may also include determining, by the controller 110, a resultant color of the light beam 154, where the light beam 154 includes the lights 514, 516, 518 according to relative contributions of individual lights of the lights 514, 516, 518 to the light beam 154 in the same manner as described above with respect to the light beam 148 and step 1006. The method 1000 may also include controlling, by the controller 110, fourth power provided to the LEDs 502, 504, 506 of the LED-optics cluster 108 at least based on the resultant color of the fourth light beam 154.

In some alternative embodiments, the method 1000 may include more or fewer steps than shown without departing from the scope of this disclosure. In some alternative embodiments, the steps of the method 1000 may be performed in a different order than shown without departing from the scope of this disclosure.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the scope of the following claims, the scope of which are to be accorded the broadest interpretation so as to encompass modifications and equivalent structures.

The invention claimed is:

1. A method of controlling a color of a light provided by a light fixture, the method comprising:
obtaining, by a controller, measured color values of first lights, wherein light emitted diodes (LEDs) of a first LED-optics cluster are configured to emit the first lights having colors that are shades of a first color that are different from each other;
obtaining, by the controller, measured color values of second lights, wherein LEDs of a second LED-optics cluster are configured to emit the second lights having colors that are shades of a second color that are different from each other;
determining, by the controller, a resultant color of a first light beam at least based on the measured color values of the first lights, wherein the first light beam includes the first lights according to relative contributions of individual lights of the first lights to the first light beam, wherein the relative contributions of individual lights of the first lights to the first light beam are determined based on a value of a target beam angle of the combined light;

determining, by the controller, a resultant color of a second light beam at least based on the measured color values of the second lights, wherein the second light beam includes the second lights according to relative contributions of individual lights of the second lights to the second light beam, wherein the relative contributions of individual lights of the second lights to the second light beam are determined based on the value of the target beam angle of the combined light; and controlling, by the controller, first power provided to the LEDs of the first LED-optics cluster and the second power provided to the LEDs of the second LED-optics cluster at least based on the resultant color of the first light beam and the resultant color of the second light beam such that a color of a combined light that is a combination at least the first light beam and the second light beam has a color matching a target color.

2. The method of claim 1, wherein the resultant color of the first light beam is determined further based on flux ratios of the first lights corresponding to a value of a target beam angle of the combined light and wherein the resultant color of the second light beam is determined further based on flux ratios of the second lights corresponding to the target beam angle.

3. The method of claim 1, further comprising controlling, by the controller, proportions of the first power provided to individual LEDs of the LEDs based on a value of a target beam angle of the combined light.

4. The method of claim 1, wherein the first LED-optics cluster comprises an LED-optics unit that includes a first LED of the LEDs of the first LED-optics cluster and a first secondary optics, wherein the second LED-optics cluster comprises an LED-optics unit that includes a second LED of the LEDs of the second LED-optics cluster and a second secondary optics.

5. The method of claim 1, further comprising:
obtaining, by the controller, measured color values of third lights, wherein LEDs of a third LED-optics cluster are configured to emit the third lights having colors that are shades of a third color that are different from each other;
determining, by the controller, a resultant color of a third light beam at least based on the measured color values of the third lights, wherein the third light beam includes the third lights according to relative contributions of individual lights of the third lights to the third light beam; and
controlling, by the controller, third power provided to the LEDs of the third LED-optics cluster at least based on the resultant color of the third light beam.

6. The method of claim 5, further comprising:
obtaining, by the controller, measured color values of fourth lights, wherein LEDs of a fourth LED-optics cluster are configured to emit the fourth lights having colors that are shades of white that are different from each other;
determining, by the controller, a resultant color of a fourth light beam at least based on the measured color values of the fourth lights, wherein the fourth light beam includes the fourth lights according to relative contributions of individual lights of the fourth lights to the fourth light beam; and controlling, by the controller, fourth power provided to the LEDs of the fourth LED-optics cluster at least based on the resultant color of the fourth light beam.

7. The method of claim 1, wherein the LEDs of the first LED-optics cluster comprise three LEDs and wherein the first lights comprise three lights.

8. The method of claim 1, wherein the first color is green and wherein the second color is white.

9. The method of claim 1, wherein the first color is green and wherein the second color is red.

10. A light fixture for emitting a light with a controllable color, the light fixture comprising:
a first LED-optics cluster designed to provide a first light beam;
a second LED-optics cluster designed to provide a second light beam; and
a controller configured to:
determine a resultant color of a first light beam at least based on measured color values of first lights, wherein the first light beam includes first lights according to relative contributions of individual lights of the first lights to the first light beam, wherein light emitted diodes (LEDs) of the first LED-optics cluster are configured to emit the first lights having colors that are shades of a first color that are different from each other, and wherein the relative contributions of individual lights of the first lights to the first light beam are determined based on a value of a target beam angle of the combined light;
determine a resultant color of a second light beam at least based on measured color values of second lights, wherein the second light beam includes the second lights according to relative contributions of individual lights of the second lights to the second light beam, wherein LEDs of the second LED-optics cluster are configured to emit the second lights having colors that are shades of a second color that are different from each other, and wherein the relative contributions of individual lights of the second lights to the second light beam are determined based on the value of the target beam angle of the combined light; and
control first power provided to the LEDs of the first LED-optics cluster and the second power provided to the LEDs of the second LED-optics cluster at least based on the resultant color of the first light beam and the resultant color of the second light beam such that a color of a combined light that is a combination at least the first light beam and the second light beam has a color matching a target color.

11. The light fixture of claim 10, wherein the resultant color of the first light beam is determined further based on flux ratios of the first lights corresponding to a value of a target beam angle of the combined light and wherein the resultant color of the second light beam is determined further based on flux ratios of the second lights corresponding to the target beam angle.

12. The light fixture of claim 10, further comprising controlling, by the controller, proportions of the first power provided to individual LEDs of the LEDs based on a value of a target beam angle of the combined light.

13. The light fixture of claim 10, wherein the LEDs of the first LED-optics cluster comprise three LEDs and wherein the first lights comprise three lights.

* * * * *